United States Patent
Matsuzaki et al.

(10) Patent No.: US 7,667,368 B2
(45) Date of Patent: Feb. 23, 2010

(54) AXIAL AIR-GAP ELECTRONIC MOTOR

(75) Inventors: Hirokazu Matsuzaki, Kawasaki (JP); Yoshiyasu Horiuchi, Kawasaki (JP); Tomonori Kojima, Kawasaki (JP); Masaki Yamada, Kawasaki (JP)

(73) Assignee: Fujitsu General Limited, Kawasaki-Shi, Kanagawa (JP)

( * ) Notice: Subject to any disclaimer, the term of this patent is extended or adjusted under 35 U.S.C. 154(b) by 369 days.

(21) Appl. No.: 11/475,158

(22) Filed: Jun. 27, 2006

(65) Prior Publication Data
US 2007/0001540 A1 Jan. 4, 2007

(30) Foreign Application Priority Data
Jun. 30, 2005 (JP) ............... 2005-192959

(51) Int. Cl.
*H02K 1/06* (2006.01)
*H02K 3/00* (2006.01)
(52) U.S. Cl. .............................. 310/268; 310/216.009; 310/194
(58) Field of Classification Search ................ 310/268, 310/216, 217, 218, 194
See application file for complete search history.

(56) References Cited

U.S. PATENT DOCUMENTS

| | | | |
|---|---|---|---|
| 5,986,377 A * | 11/1999 | Yamada et al. | 310/216 |
| 6,646,535 B2 * | 11/2003 | Miyake et al. | 336/212 |
| 6,658,721 B2 * | 12/2003 | Kazama et al. | 29/596 |
| 6,858,964 B2 * | 2/2005 | Masumoto et al. | 310/216 |
| 2003/0020358 A1 * | 1/2003 | Masumoto et al. | 310/216 |
| 2004/0051417 A1 * | 3/2004 | Yamazaki et al. | 310/216 |
| 2004/0155550 A1 * | 8/2004 | Yamamoto et al. | 310/194 |
| 2004/0164641 A1 * | 8/2004 | Yamada et al. | 310/218 |
| 2004/0222715 A1 * | 11/2004 | Yamamura et al. | 310/218 |
| 2004/0263015 A1 * | 12/2004 | Okada et al. | 310/194 |
| 2005/0067912 A1 * | 3/2005 | Murakami et al. | 310/216 |

* cited by examiner

*Primary Examiner*—Quyen Leung
*Assistant Examiner*—Alex W Mok
(74) *Attorney, Agent, or Firm*—Manabu Kanesaka

(57) ABSTRACT

In an axial air-gap electronic motor in which a stator is formed by a plurality of core members, the manpower for assembling the core member is reduced, and the motor is assembled in a shorter period of time. A hook portion 320, which is a first connecting means, is projectingly provided at one end in the circumferential direction of a flange portion 310 of each of the core members 21*a* to 21*i*, and a columnar locking shaft 330 to which the hook portion 320 is locked is provided at the other end in the circumferential direction of the flange portion 310, by which the core members 21*a* to 21*i* are connected to each other.

3 Claims, 10 Drawing Sheets

AXIAL AIR-GAP ELECTRONIC MOTOR

TECHNICAL FIELD

The present invention relates to an axial air-gap electronic motor in which a rotor and a stator are arranged so as to face to each other along the axis line direction of a rotor output shaft. More particularly, it relates to an axial air-gap electronic motor that requires less manpower for parts and is capable of being assembled easily in a short period of time.

BACKGROUND ART

As shown, for example, in Patent Document 1 (Japanese Patent Application Publication No. 2004-282989), an axial air-gap electronic motor is an electronic motor in which a rotor is arranged on one side surface or both side surfaces of a stator with a predetermined air gap being provided therebetween, and is characterized in that the thickness in the rotating shaft direction can be decreased, namely, the motor can be made flat as compared with a radial gap electronic motor of, for example, an inner rotor type.

The axial air-gap electronic motor described in Patent Document 1 is configured so that the stator is formed by a plurality of fan-shaped core members connected to each other in a ring form. According to this configuration, the stator can be formed easily by winding a coil in advance on one core member and by merely connecting the core members in a ring form and performing wire connection.

In such a stator construction, the core members have conventionally been assembled into a ring shape by fitting a concave portion provided in one end portion of the flange portion of the core member on a boss provided in the other end portion of the flange portion of the adjacent core member. However, since this assembling process is a temporary one for putting the core members in a mold for the next resin molding, the core members are easily disconnected by a slight shock.

Also, after the coil has been wound on the core member, the coil pulled out of each core member must be connected for each phase, which presents a problem in that the wire connecting work and the jumper wire treatment require much time and labor.

SUMMARY OF THE INVENTION

Accordingly, a problem of the present invention is that in an axial air-gap electronic motor in which a stator is formed by a plurality of core members, the manpower for assembling the core member is decreased, and the motor is assembled in a shorter period of time.

To solve the above-mentioned problem, the present invention has several features described below. The present invention provides an axial air-gap electronic motor in which a stator and a rotor are arranged so as to face to each other along the axis line direction of a rotor output shaft of the rotor with a predetermined air gap being provided therebetween, and the stator has a plurality of core members arranged in a ring form with the axis line of the rotor output shaft being a center, the core members being connected to each other via a predetermined connecting means, wherein each of the core members is formed into a bobbin shape having a stator iron core and an insulator for insulating a winding portion of the stator iron core; the insulator has a pair of flange portions that are parallel with each other along a teeth surface of the stator iron core; a hook portion, which is a first connecting means, is projectingly provided at one end in the circumferential direction of the each flange portion; and a columnar locking shaft to which the hook portion of the adjacent core member is locked is projectingly provided at the other end in the circumferential direction of the flange portion.

According to this configuration, since the hook portion provided in the flange portion of the insulator of a stator core is locked to the locking shaft provided in the flange portion of the insulator of the adjacent stator core, the stator cores can be connected firmly to each other.

The hook portion and the locking shaft are preferably provided on the outer periphery side of the flange portion, and on the inner periphery side of the flange portion, there is preferably provided a second connecting means including a locking convex portion provided at one end in the circumferential direction of the flange portion and a locking concave portion that is provided at the other end in the circumferential direction of the flange portion and engages with the locking convex portion.

According to this configuration, since the first connecting means consisting of the hook portion and the locking shaft is provided on the outer periphery side of the flange portion, and the second connecting means consisting of the locking convex portion and the locking concave portion is provided on the inner periphery side of the flange portion, the accuracy in assembling the stator core can be enhanced.

The flange portion is preferably provided with a guide portion for guiding the hook portion to the locking shaft, and the guide portion is preferably provided with a holding portion for holding a part of the hook portion together with the locking shaft.

According to this configuration, since the guide portion for guiding the hook portion to the locking shaft is provided, and the hook portion is held together with the locking shaft by a part of the guide portion, the hook portion can be guided surely to the locking position of the locking shaft, and the locked state can be maintained.

The guide portion preferably consists of a concave portion formed by recessing a part of the flange portion in the axis line direction of the rotor output shaft, and the holding portion preferably consists of a height difference surface formed between the guide portion and the flange portion.

According to this configuration, since the guide portion is formed by recessing a part of the flange portion, and the hook portion is held by utilizing the height difference surface, not only the hook portion can be guided easily, but also the manpower for parts and the material cost can be reduced.

The surface-to-surface distance of the inner surface of the hook portion is preferably a little smaller than the surface-to-surface distance of the guide portion.

According to this configuration, since the surface-to-surface distance of the hook portion is a little smaller than the surface-to-surface distance of the guide portion, the each guide portion can be held by the each hook portion, so that the core members can be connected more firmly.

The hook portion preferably has an arcuate hook groove locked along the locking shaft, and the core members are preferably connected to each other so as to be turnable around the locking shaft via the hook groove.

According to this configuration, since the hook groove locked along the locking shaft is provided, the core members can be connected while being turned in the state in which the hook portion is hooked to the locking shaft.

The each flange portion is preferably provided with a cylindrical portion for erecting a terminal pin, to which both ends of a coil wound around the winding portion are connected by being entangled individually, substantially perpendicularly from the flange portion.

According to this configuration, since first and second cylindrical portions for directly holding the terminal pin by which the coil is entangledly connected in the flange portion, both ends of the coil after assembly are connected entangledly to the each terminal pin, so that not only the wire connection can be performed easily but also the assembly of the motor itself can be performed easily.

Preferably, the locking shaft is also used as the cylindrical portion. According to this configuration, since the locking shaft is also used as either of the first and second cylindrical portions, the motor can be manufactured at a lower cost.

The locking shaft and/or the cylindrical portion are preferably provided with a reinforcing rib for reinforcement. According to this configuration, since the reinforcing rib is provided at the outer periphery of the cylindrical portion and/or the locking shaft, the strength decreased by the decrease in thickness of the flange portion can be compensated, and also the cylindrical portion and/or the locking shaft can be prevented from being thermally distorted at the time of resin molding.

The flange portion is preferably provided with a positioning portion for providing relative positioning between a mold and the core members when a resin compact is integrally molded in a state in which the core members are connected to each other in a ring form.

According to this configuration, since the positioning portion at the time of resin molding in a part of the flange portion is provided, the positioning of stator of the motor can be performed at a time merely by performing the relative positioning between the stator core and the mold.

Each of the core members is preferably provided with a positioning means for arranging the core members along a predetermined rotating shaft with the teeth surfaces of the flange portions facing to each other.

According to this configuration, since the plurality of stator cores are arranged so that the teeth surfaces face to each other, and the coil can be wound in one turn from one end to the other end, time required for wire connection and assembly can be shortened.

The insulator is preferably provided with a winding protective portion for covering a part of the side surface of the stator iron core to prevent a jumper wire set between the core members from coming into direct contact with the stator iron core.

According to this configuration, since the winding protective portion for covering a part of the side surface of the stator iron core is provided in a part of the insulator, the jumper wire of winding can surely be prevented from coming into direct contact with the stator iron core and being broken or damaged.

BRIEF DESCRIPTION OF THE DRAWINGS

FIG. 9A is a front view of a core member, FIG. 9B is a back view of the core member, FIG. 9D is a bottom view of the core member, FIG. 9E is a side view of the core member, and FIG. 9F is a sectional view taken along the line A-A of core member;

DETAILED DESCRIPTION

Figure 1:
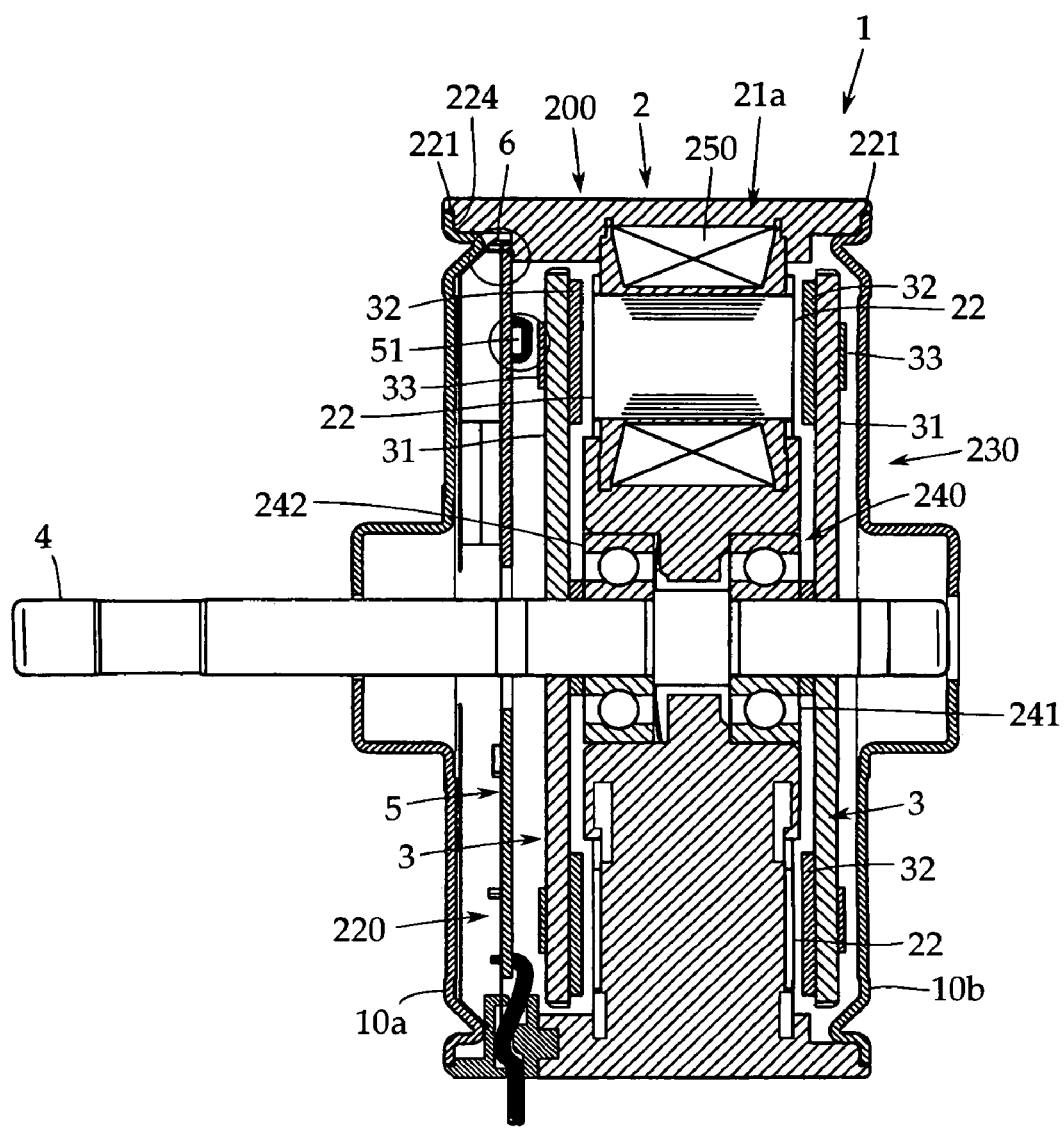
FIG. 1 is a sectional view of an essential portion of an axial air-gap electric motor in accordance with one embodiment of the present invention.
Figure 2A:
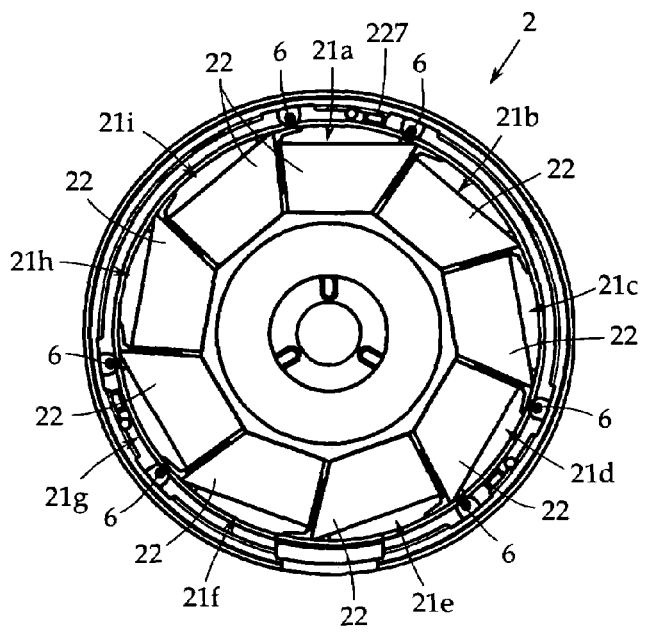
FIG. 2A is a front view of a stator of the axial air-gap electric motor.
Figure 2B:
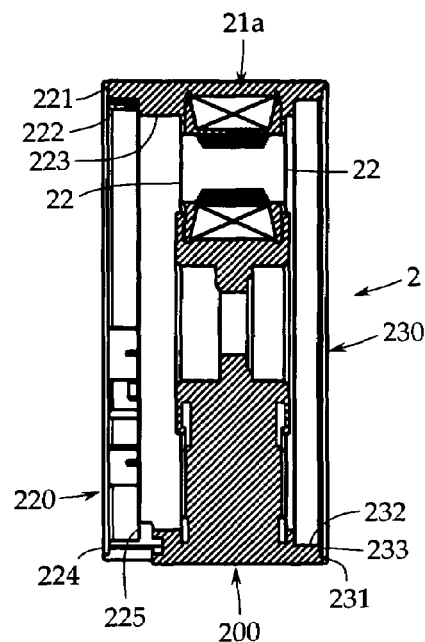
FIG. 2B is a side view of the stator.
Figure 3:
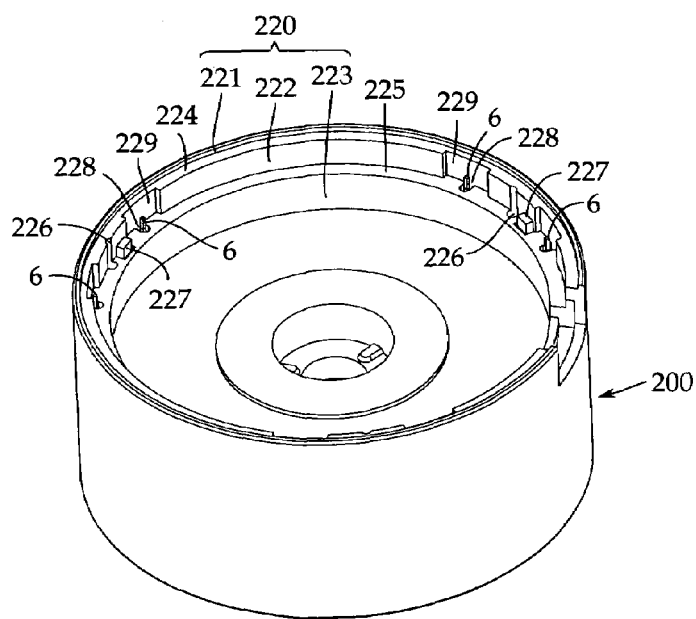
FIG. 3 is a perspective view of a stator of the axial air-gap electric motor.

An embodiment of the present invention will now be described with reference to the accompanying drawings. The present invention is not limited to this embodiment. FIG. 1 is a sectional view of an essential portion of an axial air-gap electric motor in accordance with one embodiment of the present invention. FIGS. 2A and 2B are front and side views of a stator, respectively, and FIG. 3 is a perspective view of the stator.

This axial air-gap electric motor 1 has a stator 2 embedded in a resin compact 200 and a pair of rotors 3 arranged so as to face to both side surfaces of the stator 2 with a predetermined air gap being provided. The rotors 3 are fixed coaxially on a rotor output shaft 4 for delivering a rotational driving force.

The stator 2 is formed in a ring shape with the axis line of the rotor output shaft 4 being the center, and is integrally molded together with the resin compact 200 by insert molding. At both ends of the resin compact 200, lid members 10a and 10b are installed to close both ends of the resin compact 200.

At both ends of the resin compact 200, there are provided first and second storing sections 220 and 230 for storing various motor mechanism portions including the rotors 3.

The first storing section 220 (the left-hand side in FIG. 1) consists of a concave portion recessed along the axis line direction of the rotor output shaft 4, and on the bottom surface of the concave portion, teeth surfaces 22 on one side of core members 21a to 21i of the stator 2 are exposed. In FIG. 3, the teeth surfaces 22 are omitted for the configuration of drawing.

As shown in FIG. 3, the first storing section 220 is formed into a step shape having three inner peripheral surfaces (a first inner peripheral surface 221, a second inner peripheral surface 222, and a third inner peripheral surface 223) whose inside diameters decrease stepwise from the outside toward the inside.

Between the first inner peripheral surface 221 and the second inner peripheral surface 222, a first height difference surface 224 that is horizontal along the teeth surface 22 is provided. As shown in FIG. 1, the first height difference surface 224 is a support surface for supporting the outer peripheral edge of the lid member 10a, and the lid member 10a is attached horizontally along the first height difference surface 224 together with the first inner peripheral surface 221.

Between the second inner peripheral surface 222 and the third inner peripheral surface 223, a similarly horizontal second height difference surface 225 is provided. The second height difference surface 225 is a support surface for supporting a circuit board 5 for driving the motor, and is formed one step lower than the first height difference surface 224.

Figure 4:
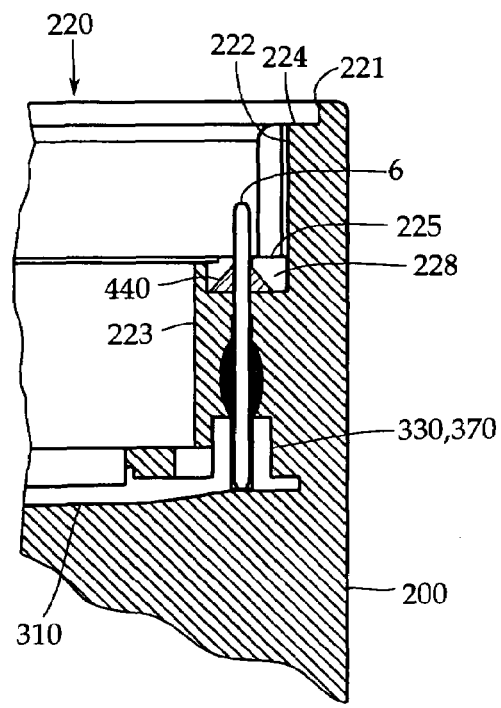
FIG. 4 is a sectional view of an essential portion of a stator, enlargedly showing a portion near a terminal pin.

As shown in a partially enlarged view of FIG. 4, on the second height difference surface 225, the tip end portions of terminal pins 6 provided on the stator 2 are projectingly provided. The terminal pins 6 are erected substantially perpendicularly from flange portions 310 of the core members 21a to 21i of the stator 2, and to a part thereof, the start end and the termination end of a coil 250 are connected in an entangled state respectively.

The terminal pins 6 are provided in a set of two at three places (a total of six places) for each phase (U phase, V phase, and W phase) of the electric motor. In this example, the terminal pins 6 are erected from the core members 21a, 21d and 21g respectively.

According to this configuration, as shown in FIG. 1, by mounting the circuit board 5 along the second height difference surface 225, the terminal pins 6 can be inserted directly in insertion holes, not shown, provided in the circuit board 5.

As a more preferred mode, it is preferable that the periphery of the terminal pins 6 on the second height difference surface 225 has a recessed portion 228 which is one step lower from the second height difference surface. According to this configuration, a portion formed into a convex shape by a synthetic resin 440 entering into a portion around the terminal pin 6 at the time of insert molding because of insufficient seal between the mold and the pin can be prevented from rising to a convex shape, so that the circuit board 5 can surely be mounted horizontally.

Also, it is preferable that a part of the second inner peripheral surface 222, which is adjacent to the terminal pin 6, is further recessed in the radial direction, thereby forming a further recessed portion 229. According to this configuration, a short circuit from the tip end of the terminal pin 6 toward the lid member 10a can be prevented.

Figure 5:
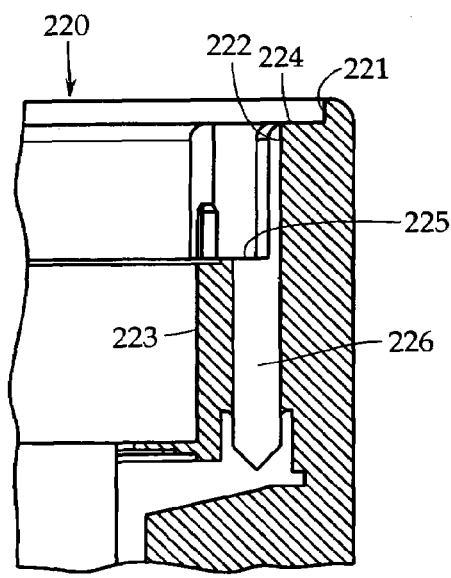
FIG. 5 is a sectional view of an essential portion of a stator, enlargedly showing a portion near a guide hole.

The second height difference surface 225 is further formed with guide holes 226. As shown in FIG. 5, the guide hole 226 is formed by insert molding by inserting a guide pin, not shown, in a guide hole 361 in a positioning portion 360 provided on the core member 21a, 21d, 21g when the stator 2 is insert molded.

On the second height difference surface 225, locking claws 227 are provided which coincide with notch portions, not shown, provided in the circuit board 5 and are used to position the circuit board 5 with respect to the stator 2. The locking claw 227 is provided so as to project toward the inside, and, in this example, is provided at three places at a predetermined angle.

The second storing section 230 (the right-hand side in FIG. 1) consists of a concave portion recessed along the axis line direction of the rotor output shaft 4, and on the bottom surface of the concave portion, teeth surfaces 22 on the other side of core members 21a to 21i of the stator 2 are exposed.

The second storing section 230 is formed into a step shape having two inner peripheral surfaces (a first inner peripheral surface 231 and a second inner peripheral surface 232) whose inside diameters decrease stepwise from the outside toward the inside.

Between the first inner peripheral surface 231 and the second inner peripheral surface 232, a first height difference surface 233 that is horizontal along the teeth surface 22 is provided. As shown in FIG. 1, the first height difference surface 233 is a support surface for supporting the outer peripheral edge of the other lid member 10b, and the lid member 10b is attached horizontally along the first height difference surface 233 together with the first inner peripheral surface 231.

In the central portion of the stator 2 is arranged a bearing section 240. In this example, the bearing section 240 has a pair of radial ball bearings 241 and 242, the inner race thereof being press fitted in the rotor output shaft 4, and the outer race side being embedded in the resin compact 200. In the present invention, the configuration of the bearing section 240 may be arbitrary.

In each of the first and second storing sections 220 and 230, a disc-shaped rotor 3 is arranged so as to be rotatable. The rotor 3 is provided with a rotor magnet 32 on the surface facing to the stator 2 of a disc-shaped rotor back yoke 31. On the surface opposite to the surface facing to the opposite stator 2 (on the circuit board 5 side) of a disc-shaped rotor back yoke 31, a position detecting magnet 33 is provided which serves as a detected portion of a position detecting sensor 51 mounted on the circuit board 5.

In the present invention, the rotor 3 may have an arbitrary shape if it has a basic configuration for an axial air-gap electric motor. In this example, the rotors 3 are arranged on both right and left sides of the stator 2; however, the rotor may be arranged only on one side.

Further, although the rotors 3 has the same rotor output shaft 4 in common, a two-output shaft type may be used in which each of the rotors 3 has a respective rotor output shaft. Also, a shaft-less type may be used in which the rotors 3 are directly supported on the stator 2 via a radial ball bearing without the use of the rotor output shaft 4.

Figure 6:
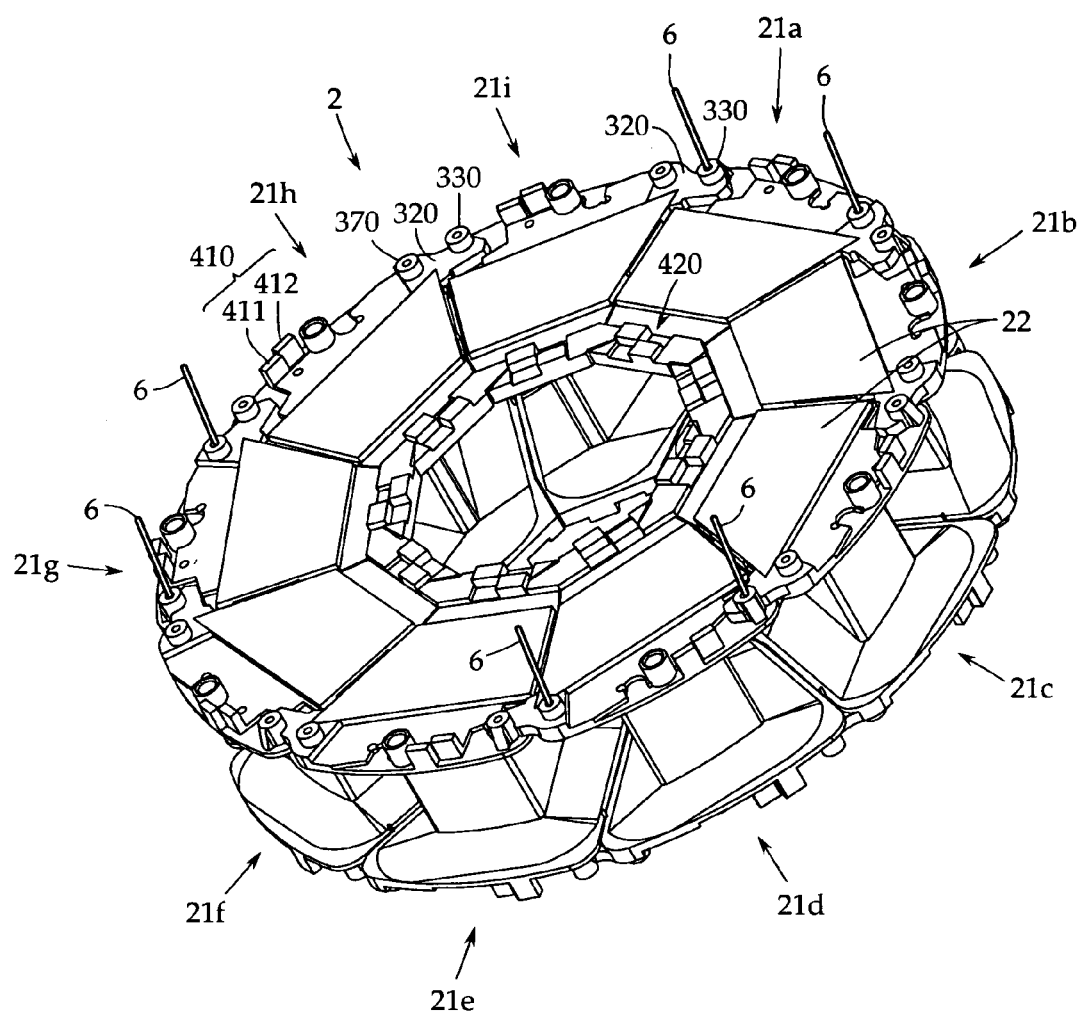
FIG. 6 is a perspective view of a stator core.
Figure 7A:
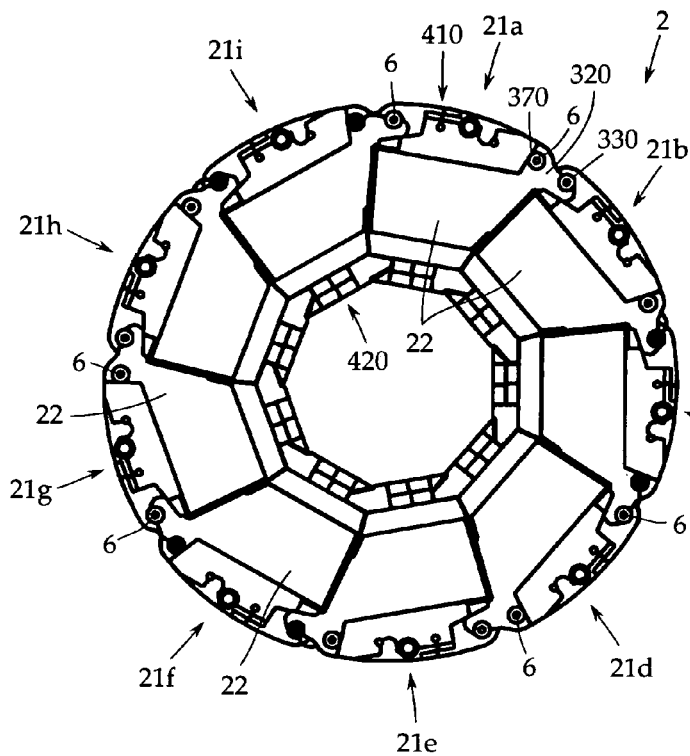
FIG. 7A is a front view of the stator core.
Figure 7B:
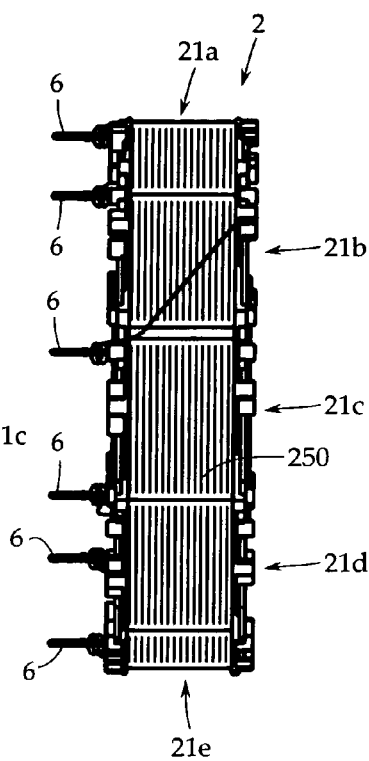
FIG. 7B is a side view of the stator core.
Figure 8A:
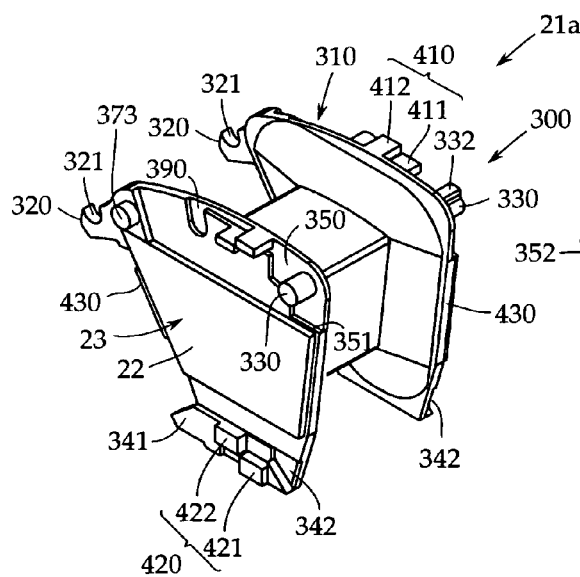
FIG. 8A is a perspective view of a core member, viewed from one flange portion side.
Figure 8B:
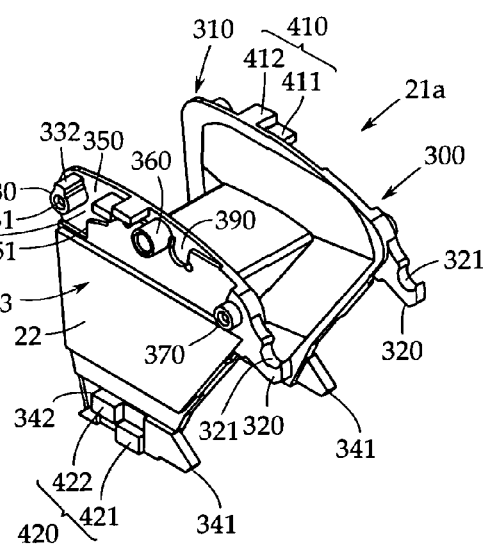
FIG. 8B is a perspective view of the core member, viewed from the other flange portion side.
Figure 9C:
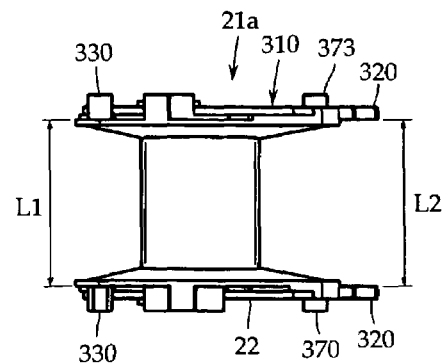
FIG. 9C is a plan view of the core member.
Figure 9C:
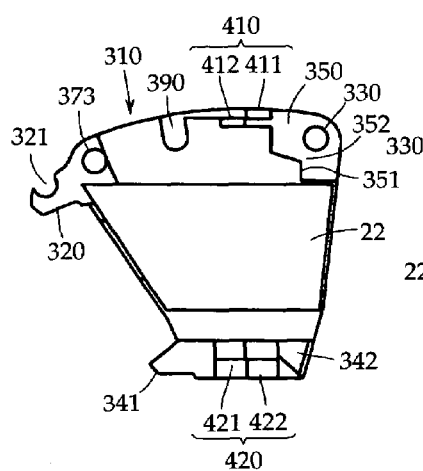
Figure 9C:
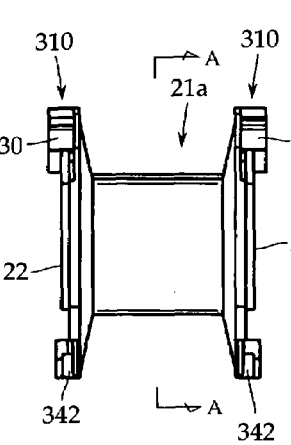
Figure 9C:
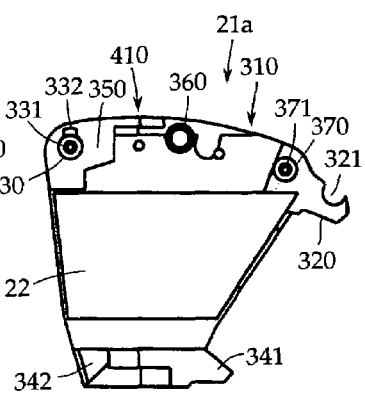
Figure 9C:
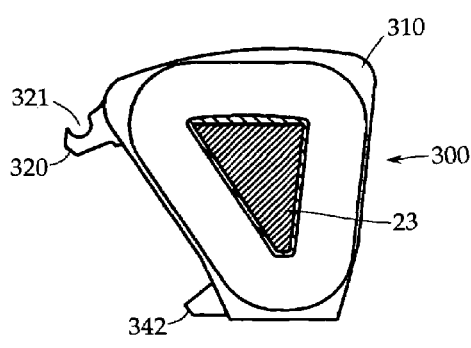
Figure 9C:
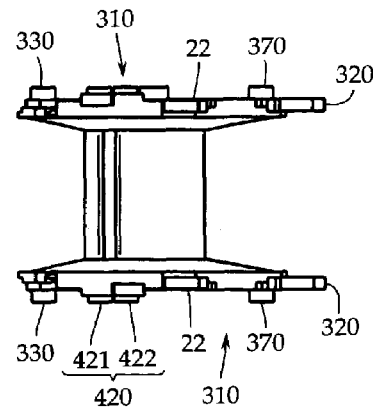

Next, the stator 2 is explained. FIG. 6 is a perspective view of the stator 2, and FIGS. 7A and 7B are front and side views of a stator core, respectively. FIGS. 8A and 8B are perspective views of a core member, FIG. 9A is a front view of the core member, FIG. 9B is a back view, FIG. 9C is a plan view, FIG. 9D is a bottom view, FIG. 9E is a side view, and FIG. 9F is a sectional view taken along the line A-A.

As shown in these figures, the stator 2 includes the plurality of (in this example, nine (nine-slot)) core members 21a to 21i arranged in a ring form with the rotation axis line of the rotor output shaft 4 being the center axis. Since the core members 21a to 21i have the same construction, in this example, the core member 21a is explained as an example.

As shown in FIGS. 8A and 8B, the core member 21a has a bobbin-shaped stator iron core 23 having a pair of right and left flange-shaped teeth surfaces 22, and the coil 250 (refer to FIG. 1) is wound on the stator iron core 23. The stator iron core 23 is formed by laminating H-shaped magnetic steel sheets in the radial direction.

In this example, at both ends of the teeth surface 22 of the stator iron core 23, a skew tilted at a predetermined angle is formed in the circumferential direction to reduce cogging torque. The shape of the teeth surface 22, including the presence of the skew, is selected arbitrarily according to the motor specification.

The whole of the stator iron core 23 excluding the teeth surfaces 22 is covered by an insulator 300 consisting of an insulating resin. The insulator 300 has the flange portions 310 extending in the radial direction along the teeth surfaces 22. These flange portions 310 also form a part of the bobbin on which the coil 250 is wound.

Each of the flange portions 310 is provided with two connecting means for connecting the core members 21a to 21i to each other. First, as a first connecting means, in the end portions in the circumferential direction of the flange portions 310, there are provided hook portions 320 for connecting the core members 21a to 21i to each other in a ring form with the rotor output shaft 4 being the center and locking shafts 330 to which the hook portions 320 are locked.

Figure 10A:
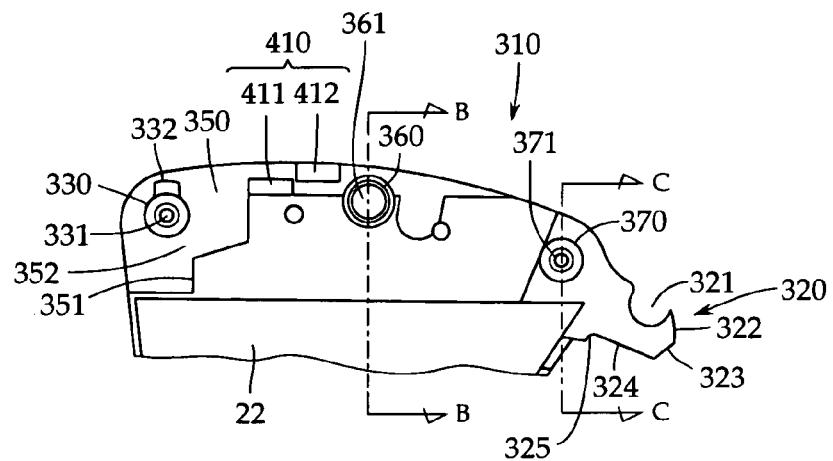
FIG. 10A is an enlarged side view showing the outer periphery side of one flange portion of a core member.
Figure 10B:
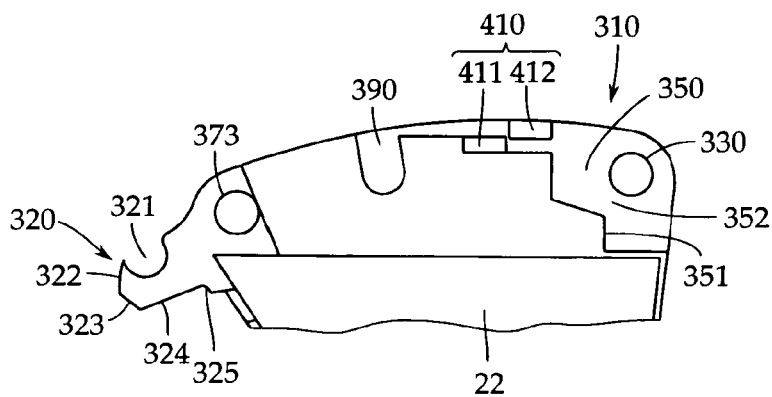
FIG. 10B is an enlarged side view showing the outer periphery side of the other flange portion of a core member.

Referring additionally to partially enlarged views of FIGS. 10A and 10B, the hook portion 320 is a convex portion provided so as to project from one end portion in the circumferential direction (the right end in FIG. 10A) toward the outside on the outer periphery side of the flange portion 310, and on the upper end face of the hook portion 320, there is provided a hook groove 321 locked along the locking shaft 330.

The hook groove 321 consists of an arcuate groove locked along the outer peripheral surface of the locking shaft 330. By locking the hook groove 321 to the locking shaft 330 of the adjacent core member 21a to 21i, the core members 21a to 21i are turnably connected to each other with the locking shaft 330 being the center.

The hook portion 320 is provided with first to third guide surfaces 322 to 324 for locking the hook portion 320 to the locking shaft 330 smoothly. The first guide surface 322 consists of a taper surface formed slantwise right downward (refer to FIG. 10A) from the edge of the hook groove 321 toward the tip end.

The second guide surface 323 consists of a taper surface formed slantwise left downward (refer to FIG. 10A) from the tip end of the first guide surface 322 toward the flange portion 310 side, and the third guide member 324 consists of a taper surface formed slantwise left upward (refer to FIG. 10A) from the end portion of the second guide surface 323 toward the proximal end of the flange portion 310.

In the root portion between the third guide surface 324 and the flange portion 310, there is provided a rounded portion 325 which comes into contact along a guide portion 350 when both ends of the core members 21a to 21i are finally connected after the core members 21a to 21i have been connected to each other.

The locking shaft 330 is provided so as to project to the other end side in the circumferential direction on the outer periphery side of the flange portion 310 (the end portion on the side opposite to the hook portion 320), and is integrally formed on the flange portion 310 in a columnar form. In this example, the locking shafts 330 are provided coaxially with the flange portion 310 being held therebetween.

Of the locking shafts 330, one (the front side in FIG. 8B) of the locking shafts 330 is provided with a support hole 331 with a predetermined depth along the axial direction. The support hole 331 consists of an insertion hole for erecting the terminal pin 6, and the terminal pin 6 is erected substantially perpendicularly in the support hole 331.

One of the locking shafts 330 is provided with a reinforcing rib 332 for compensating the strength of the flange portion 310 including the locking shaft 330 lowered by decreased thickness of the guide portion 350. In this example, the reinforcing rib 332 is provided at a position not subjected to an intervention by the hook portion 7, namely, on the upper surface side of the locking shaft 330. The other of the locking shafts 330 consists of a simple columnar body.

Although the reinforcing rib 332 is provided on only one of the locking shafts 330, it is a matter of course that the reinforcing rib 332 may be provided on both of the locking shafts 330. Also, the shape and the number of the reinforcing ribs 332 can be changed arbitrarily if the position thereof does not interfere with the locking position of the hook portion 320.

As a preferable mode, as shown in FIG. 9C, the surface-to-surface distance L2 between the inner surfaces of the hook portions 320 is made shorter than the surface-to-surface distance L1 between the guide portions 350 of the flange portions 310.

According to this configuration, by installing the hook portions 320 on the flange portions 310, the hook portions 320 can be fixed more firmly by supporting the flange portions 310 held therebetween.

Figure 12A:
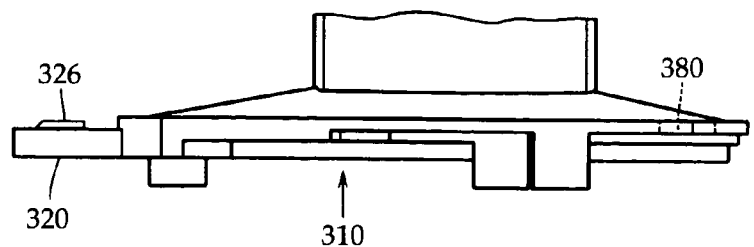
FIG. 12A is a partially enlarged front view showing a modification of a first connecting means.
Figure 12B:
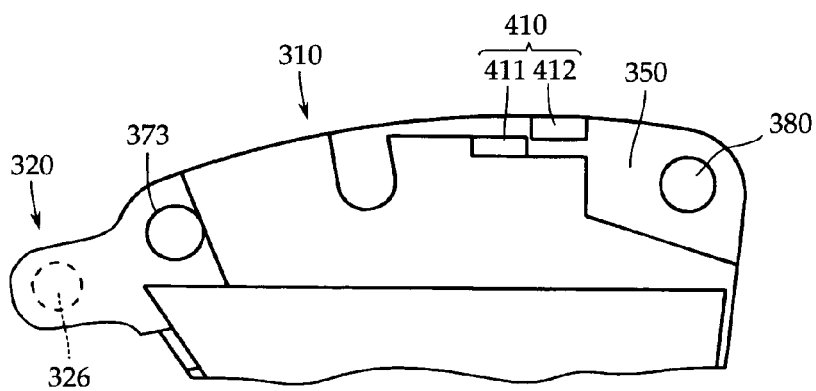
FIG. 12B is a partially enlarged plan view showing a modification of a first connecting means.

In this example, the first connecting means connects the core members 21a to 21i to each other by locking the hook groove 321 of the hook portion 320 to the locking shaft 330. Besides, as shown in FIGS. 12A and 12B, the configuration may be such that a convex portion 326 is provided on the inside in the axial direction of the hook portion 320, and a concave portion 380 is provided in the guide portion 350 of the flange portion 310, by which the convex portion 326 is fitted in the concave portion 380. Although the convex portion 326 and the concave portion 380 are formed into a round shape, these portions may have a polygonal shape.

The flange portion 310 is provided with a locking convex portion 341 serving as a second connecting means and a locking concave portion 342 for receiving the locking convex portion 341. The locking convex portion 341 is a convex portion provided so as to project to the outside from one end portion (the right-hand side surface in FIG. 9A) in the circumferential direction of the flange portion 310, and, in this example, consists of a tongue element formed into a triangular shape.

On the other hand, the locking concave portion 342 consists of a notch portion formed so as to be directed toward the inside from the other end portion (the left-hand side surface in FIG. 9A) in the circumferential direction of the flange portion 310, and is formed as a triangular shape coinciding with the locking convex 341.

In this example, the locking convex portion 341 and the locking concave portion 342 are formed into a triangular shape. However, the shape thereof can be changed arbitrary according to the motor specification such as a square or semicircle shape if the shape is such as to be capable of connecting the core members 21a to 21i to each other in a ring form.

According to this configuration, by engaging the locking convex portion 341 and the locking concave portion 342 with each other together with the first connecting means, the pole members 21a to 21i can be connected to each other in a ring form surely with high accuracy.

As shown in FIGS. 10A and 10B, the flange portion 310 is further provided with the guide portion 350 for guiding the hook portion 320 to the locking shaft 330.

The guide portion 350 consists of a concave portion formed by recessing a part of the flange portion 310 in the axis line direction of the rotor output shaft 4. In a boundary portion between the guide portion 350 and the flange portion 310, a height difference surface 351 is provided to guide the hook portion 320 and also to hold a part of the hook portion 320 together with the locking shaft 330.

A part of the height difference surface 351 is formed into a step shape, and a holding portion 352 is formed to support the hook portion 320 by holding it between the locking shaft 330 and the height difference surface 351. According to this configuration, the height difference surface 351 comes into contact with a part of the hook portion 320, by which the hook portion 320 can be fixed firmly by being held together with the locking shaft 330.

Figure 11A:
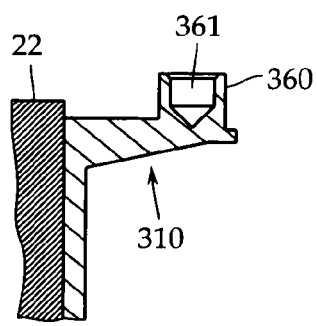
FIG. 11A is a sectional view taken along the line B-B of FIG. 10A.
Figure 11B:
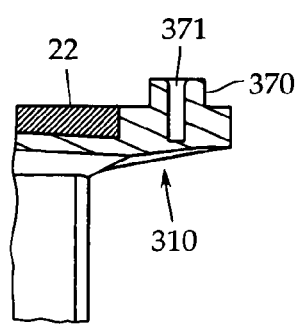
FIG. 11B is a sectional view taken along the line C-C of FIG. 10A.

As shown in FIGS. 10A and 11B, the flange portion 310 is provided with a positioning portion 360 for providing relative positioning between the mold and the core members 21a to 21i when the resin compact 200 is integrally molded by insert molding after the core members 21a to 21i have been connected in a ring form.

The positioning portion 360 consists of a cylindrical boss projectingly provided in a substantially central portion at the upper end of one flange portion 310, and in the center thereof is provided a guide hole 361 into which a guide pin, not shown, is inserted. The bottom portion of the guide hole 361 is formed into a conical shape to facilitate the introduction of the guide pin.

In the flange portion 310 on the front side shown in FIG. 11A, a cylindrical portion 370 in which the other terminal pin 6 is erected is further provided. The cylindrical portion 370 is provided with a support hole 371 for erecting the terminal pin 6 so that the terminal pin 6 is erected substantially perpendicularly via the support hole 371.

The flange portion 310 on the front side shown in FIG. 11B is also provided with a cylindrical portion 373 having the same shape as that of the cylindrical portion 370. However, the cylindrical portion 373 consists simply of a columnar body, and is projectingly provided coaxially with the cylindrical portion 370 with the flange portions 310 being held therebetween. The cylindrical portion 370 is provided on a concentric circle with the center axis of the rotor output shaft 4 being the center.

The flange portion 310 further has a first positioning portion 410 and a second positioning portion 420 as positioning means for arranging the core members 21a to 21i along a predetermined horizontal rotating shaft with the teeth surfaces 22 of the flange portions 310 facing to each other.

The first positioning portion 410 has a pair of positioning ribs 411 and 412 provided on the outer periphery side of the flange 310, and each of the positioning ribs 411 and 412 consists of a rectangular plate body provided so as to project perpendicularly from the flange portion 310. The positioning ribs 411 and 412 are arranged in a state of being shifted relatively in the circumferential direction and the radial direction of the stator 2 on the flange portion 310.

The second positioning portion 420 has a pair of positioning ribs 421 and 422 provided on the inner periphery side of the flange portion 310, and each of the positioning ribs 421 and 422 consists of a rectangular plate body provided so as to project perpendicularly from the flange portion 310. The positioning ribs 421 and 422 are also arranged in a state of being shifted relatively in the circumferential direction and the radial direction of the stator 2 on the flange portion 310.

Figure 13:
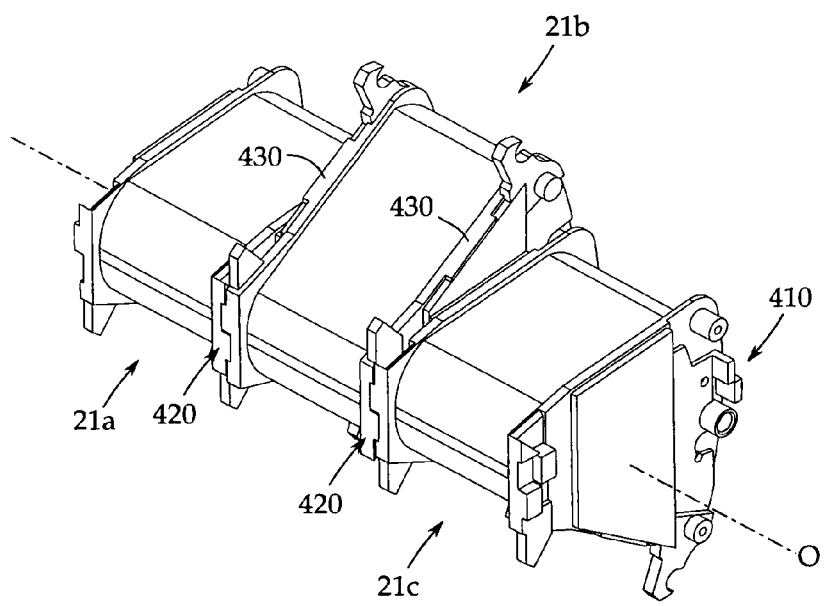
FIG. 13 is a perspective view showing a state in which core members are arranged in a rod form.

According to this configuration, by engaging the positioning ribs 411 and 412 with each other with the teeth surfaces 22 of the adjacent core members (for example, 21a and 21b) facing to each other, as shown in FIG. 13, the core members 21a to 21c (21d to 21f, 21g to 21i) are arranged for each phase along the horizontal rotating shaft O, and thus the coil 250 can be wound on the core members 21a to 21c in one turn without being cut.

On the upper end side of the flange portion 310, receiving portions 390 are provided which receive the tip ends of the locking shaft 330 and the positioning portion 360 when the teeth surfaces of the core members 21a to 21i are caused to butt together as shown in FIG. 13.

The receiving portion 390 consists of a concave portion formed into a U shape on the upper end side of the flange portion 310, and the tip ends of the locking shaft 330 and the positioning portion 360 are locked to the receiving portions 390. In this example, the receiving portion 390 consists of the concave portion; however, the receiving portion 390 may be a boss or the like.

As shown in FIG. 13, on one end side in the circumferential direction of the flange portion 310, there is provided a winding protective portion 430 for covering the side surface of the teeth surface 22 of the stator iron core 23 from which the flange portion 301 projects.

The winding protective portion 430 consists of a rib erected along the side surface of the teeth surface 22 so that the side surface of the teeth surface 22 is covered by the rib. According to this configuration, as shown in FIG. 13, a jumper wire set between the core members 21a to 21i can be prevented from being broken or damaged by a direct contact with the stator iron core 23 when the coil 250 is wound in one turn.

Figure 14A:
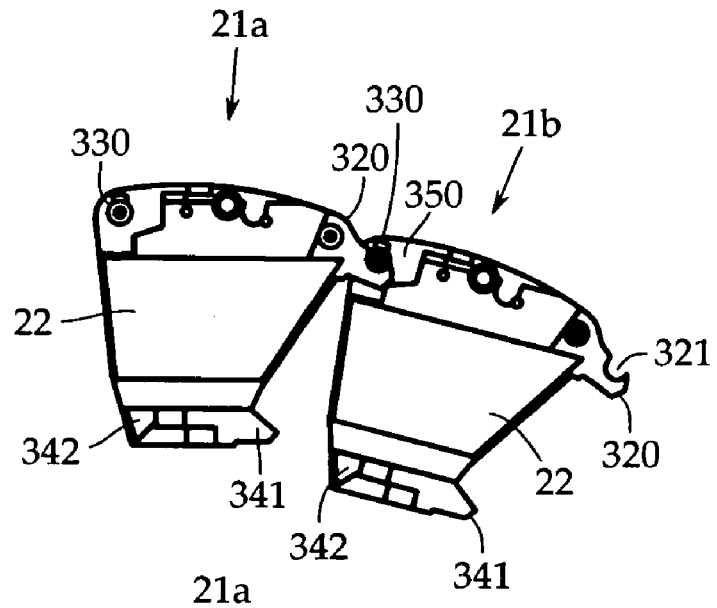
FIGS. 14A to 14C are explanatory views for illustrating a step of connecting core members.

Next, one example of a connecting procedure for the core members 21a to 21i is explained with reference to FIGS. 14A to 14C and 15A to 15D. First, as shown in FIG. 14A, the hook groove 321 in the hook portion 320 of the core member 21a is hooked to the locking shaft 330 of the adjacent core member 21b.

Figure 14B:
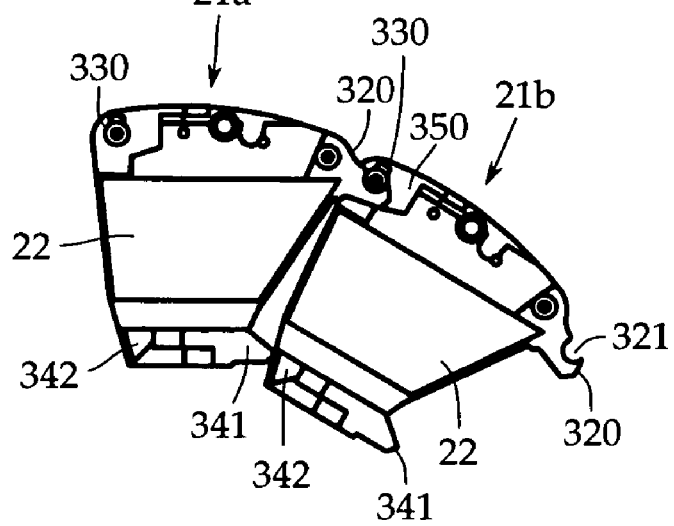

Then, as shown in FIG. 14B, the core member 21b is turned to the core member 21a side around the locking shaft 330 in the state in which the hook portion 320 is hooked to the locking shaft 330. Therefore, the tip end portion of the hook portion 320 passes through the holding portion 352 formed between the locking shaft 330 and the height difference surface 351 while being turned.

Figure 14C:
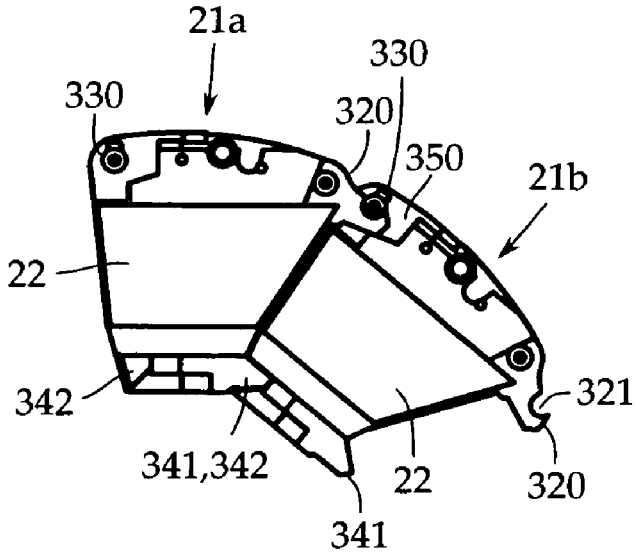

When the core member 21b is further turned to the core member 12a side, as shown in FIG. 14C, the locking concave portion 342 of the core member 21b is inserted toward the locking convex portion 341 of the core member 21a, which is the second connecting means, by which the core member 21a and the core member 21b are connected to each other. At this time, the holding portion 352 acts as a stopper to restrain the tip end of the hook portion 320, by which the movement of the core member 21a in the arrow-marked direction is regulated.

Figure 15A:
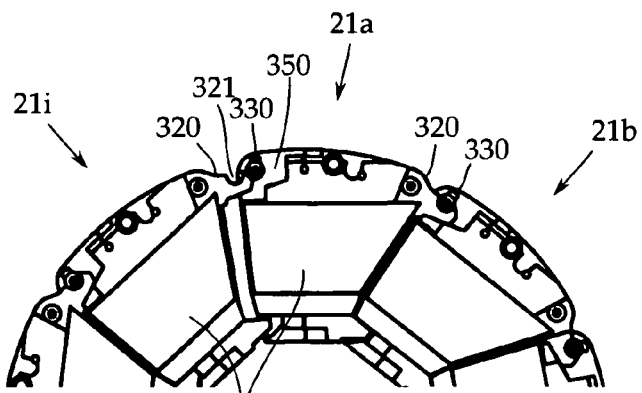
FIGS. 15A to 15D are explanatory views for illustrating a step of connecting core members.

A series of operations described above are repeated for each of the core member 21a to 21i. Finally, the end portion of the core member 21a is connected to the end portion of the core member 21i. As shown in FIG. 15A, the tip end portion of the hook portion 320 of the core member 21i is brought into contact with the locking shaft 330 of the core member 21a.

Figure 15B:
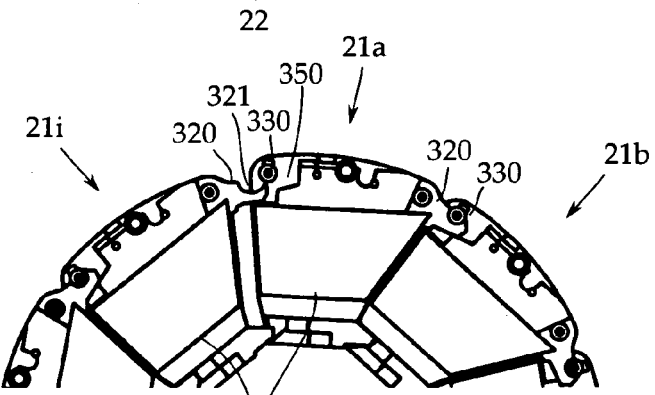

When the hook portion 320 is pushed into the locking shaft 330 side in the state in which the hook portion 320 is in contact, as shown in FIG. 15B, the hook portion 320 is pushed into the lower side of the locking shaft 330 along the first guide surface 322 (refer to FIG. 10A).

Figure 15C:
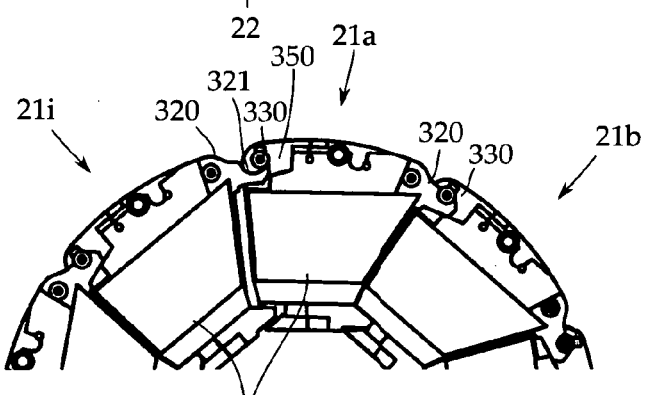

When the hook portion 320 is further pushed in, as shown in FIG. 15C, the second guide surface 323 of the hook portion 320 comes into contact with the height difference surface 351, and a part of the third guide surface 324 comes into contact with a corner portion of the teeth surface 22, so that the hook portion 320 passes through a narrow portion between the locking shaft 330 and the holding portion 351 while being deformed elastically.

Figure 15D:
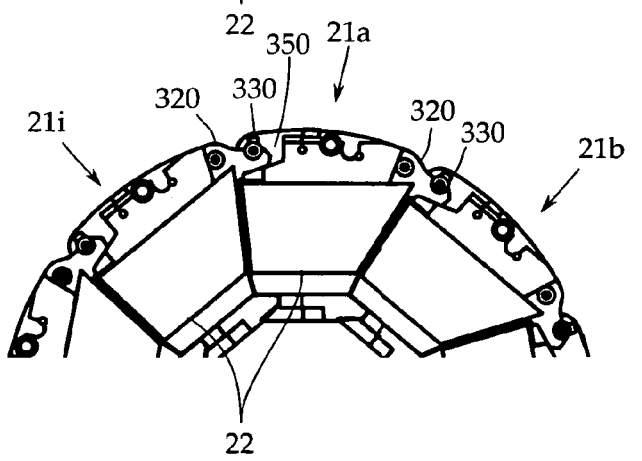

Then, when the hook portion 320 is further pushed in, as shown in FIG. 15D, the hook portion 320 is pushed in while the rounded portion 325 of the third guide surface 324 is guided along the edge of the teeth surface 22. Finally, the locking groove 321 of the hook portion 320 fits along the locking shaft 330. Thereby, the movement of the tip end of the hook portion 320 is regulated by the holding portion 351, so that the circular shape can be kept. By the series of operations described above, the core members 21a to 21i are assembled into a ring shape.

The assembled stator 2 is attached to a special-purpose insert mold (not shown). At this time, guide pins of the mold is caused to coincide with the guide holes 361 in the positioning portions 360 of the core members 21a to 21i, by which the relative positioning between the mold and the stator 2 can be performed. By this positioning work, not only the positioning of the stator 2 with respect to the resin compact 200 but also the relative positioning between the rotors 3 and the circuit board 5 can be performed.

After the assembly in the mold has been finished, molten resin is poured into the mold, and the resin compact 200 is integrally molded. After the bearing section 240 has been attached to the stator 2 and the rotors 3 have been assembled thereto, the circuit board 5 is fixed on the second height difference surface 225 of the first storing section 220, and the insertion holes in the circuit board 5 and the terminal pins 6 are soldered to each other.

After the insulating sheet (not shown) has further been put on the circuit board 5, the lid members 10a and 10b are installed finally on both surfaces of the resin compact 200, by which the axial air-gap electric motor 1 as shown in FIG. 1 is completed.

In this embodiment, the axial air-gap electric motor 1 is of a 9-slot 8-pole type in which the stator 2 has nine slots and each of the rotors 3 has eight poles. However, the number of slots of the stator 2 and the number of poles of the rotor 3 can be changed arbitrarily according to the motor specification.

The present application is based on, and claims priority from, Japanese Applications Serial Number JP2005-192959, filed Jun. 30, 2005 the disclosure of which is hereby incorporated by reference herein in its entirety.

The invention claimed is:

1. An axial air-gap electronic motor, comprising:
rotor having a rotor output shaft, and
a stator arranged to face the rotor along an axis line direction of the rotor output shaft with a predetermined air gap therebetween, and having a plurality of core members arranged in a ring form around an axis line of the rotor output shaft, each of the core members forming a bobbin shape and having a stator iron core having a winding portion, a teeth surface, and an insulator for insulating the winding portion, said insulator having a pair of flange portions parallel with each other along the teeth surface of the stator iron core, each of the flange portions including first connecting means having a hook portion projecting in a circumferential direction from one end of the flange portion, said hook portion having a hook groove opening radially outwardly therefrom, and a columnar locking shaft perpendicularly projecting from a surface of the flange portion at the other end thereof so that the hook groove of one core member is locked to the columnar locking shaft of another core member adjacent to the one core member,
wherein each of the flange portions further includes a guide portion for guiding the hook portion to the locking shaft, the guide portion having a holding portion for holding a tip part of the hook portion together with the locking shaft and a portion having a width greater than the holding portion to introduce the hook portion.

2. The axial air-gap electronic motor according to claim 1, wherein the guide portion comprises a concave portion formed by recessing a part of the flange portion in the axis line direction of the rotor output shaft, and the holding portion comprises a height difference surface formed between the guide portion and the flange portion.

3. The axial air-gap electronic motor according to claim 1, wherein a surface-to-surface distance of an inner surface of the each hook portion is smaller than a surface-to-surface distance of the each guide portion.

* * * * *